United States Patent

Pöhler

[15] 3,636,277

[45] Jan. 18, 1972

[54] VIDEO TAPE RECORDER WITH SINGLE MOTOR-DRIVING HEAD WHEEL AND CAPSTAN THROUGH RESPECTIVE MAGNETIC CLUTCHES

[72] Inventor: Herbert Pöhler, Rosenstrasse 17,6055, Hausen bei Offenbach/Main, Germany

[22] Filed: Dec. 23, 1969

[21] Appl. No.: 887,799

[52] U.S. Cl...................179/100.2 T, 178/6.6 A, 192/84 PM, 310/103

[51] Int. Cl.....................................G11b 21/04, H02k 49/10

[58] Field of Search...............178/6.6 A, 6.6 P; 179/100.2 T; 192/84 PM; 310/103

[56] References Cited

UNITED STATES PATENTS

| | | | |
|---|---|---|---|
| 3,201,674 | 8/1965 | Wada | 178/6.6 A |
| 3,267,310 | 8/1966 | Ireland | 310/103 |
| 3,429,992 | 2/1969 | Prochnow | 179/100.2 T |
| 3,431,353 | 3/1969 | Kihara et al. | 179/100.2 T |

*Primary Examiner*—Bernard Konick
*Assistant Examiner*—J. Russell Goudeau
*Attorney*—Kurt Kelman

[57] ABSTRACT

In a magnetic video tape recorder having one or more rotating magnetic heads, a single motor is provided and is connected with the rotating head or heads by a coupling. The coupling has an input element of a material having high remanence and permeability and requiring but a small coercive force, a so-called hysteresis material, and a permanently magnetic output element which rotates coaxially with the input element and is connected with the drive mechanism of the rotating magnetic head or heads or with the tape-feeding mechanism.

4 Claims, 4 Drawing Figures

INVENTOR:
HERBERT POHLER
By [signature]
AGENT

INVENTOR:
HERBERT POHLER
By [signature]
AGENT

VIDEO TAPE RECORDER WITH SINGLE MOTOR-DRIVING HEAD WHEEL AND CAPSTAN THROUGH RESPECTIVE MAGNETIC CLUTCHES

This invention relates to magnetic video tape recorders, and particularly to recorders having a rotating wheel carrying one or more magnetic heads.

In its more specific aspects, this invention is concerned with a synchronous drive arrangement in a video tape recorder for feeding the tape and for rotating the wheel for the magnetic head or heads.

A known video tape recorder of the general type referred to is equipped with two separate drive motors which are synchronized by a complex and costly electrical system. Even more motors are employed in other known video tape recorders. The known recorders which employ only a single motor are equipped with magnetic clutches whose transmitted torque is affected by changes in the applied load, and which moreover require a strong magnetic field and generate undesired heat.

The object of the invention is the provision of a video tape recorder having a traveling tape, film, or like recording medium and a rotating magnetic head or heads, but requiring only one electric drive motor. According to this invention, if the motor has a constant speed, it is connected with the tape feed mechanism and with the rotating head by a single coupling. If another type of motor with varying speed is used, two couplings are required. Each coupling has an input element of a material having high remanence and permeability and requiring but small coercive force, hereinafter referred to as a hysteresis material. The permanently magnetic output element is arranged opposite the input element and is connected with the drive mechanism for rotating the wheel-carrying magnetic head or heads, or with the feed mechanism for the tape.

It is preferred to couple the drive for the tape supply reel and/or the tape takeup reel with the output shaft of the motor by means of a permanent magnet coupling which may be equipped with a step-up or stepdown transmission.

The term hysteresis coupling, as employed herein, will be understood to refer to a permanent magnet coupling consisting of two coupling elements separated by an airgap and arranged for rotating about a common axis, one disc element consisting of a permanently magnetic material having relatively great remanence and permeability and requiring a relative small coercive force, a so-called hysteresis material, whereas the other and heavier element includes a permanently magnetic ceramic material. In such an arrangement, one element of the coupling may be magnetized by the other. It is an essential feature of a hysteresis coupling that its transmitted torque is independent of the relative rotary speed. Since the torque of the driving coupling element is derived from an electric motor by way of the hysteresis coupling, the torque remains constant and is transmitted in a constant manner to the drive mechanisms for the rotating video heads and for the magnetic tape regardless of their relative rotary speeds.

An embodiment of the invention is shown by way of example in the drawing in which.

Figures 1, 2:
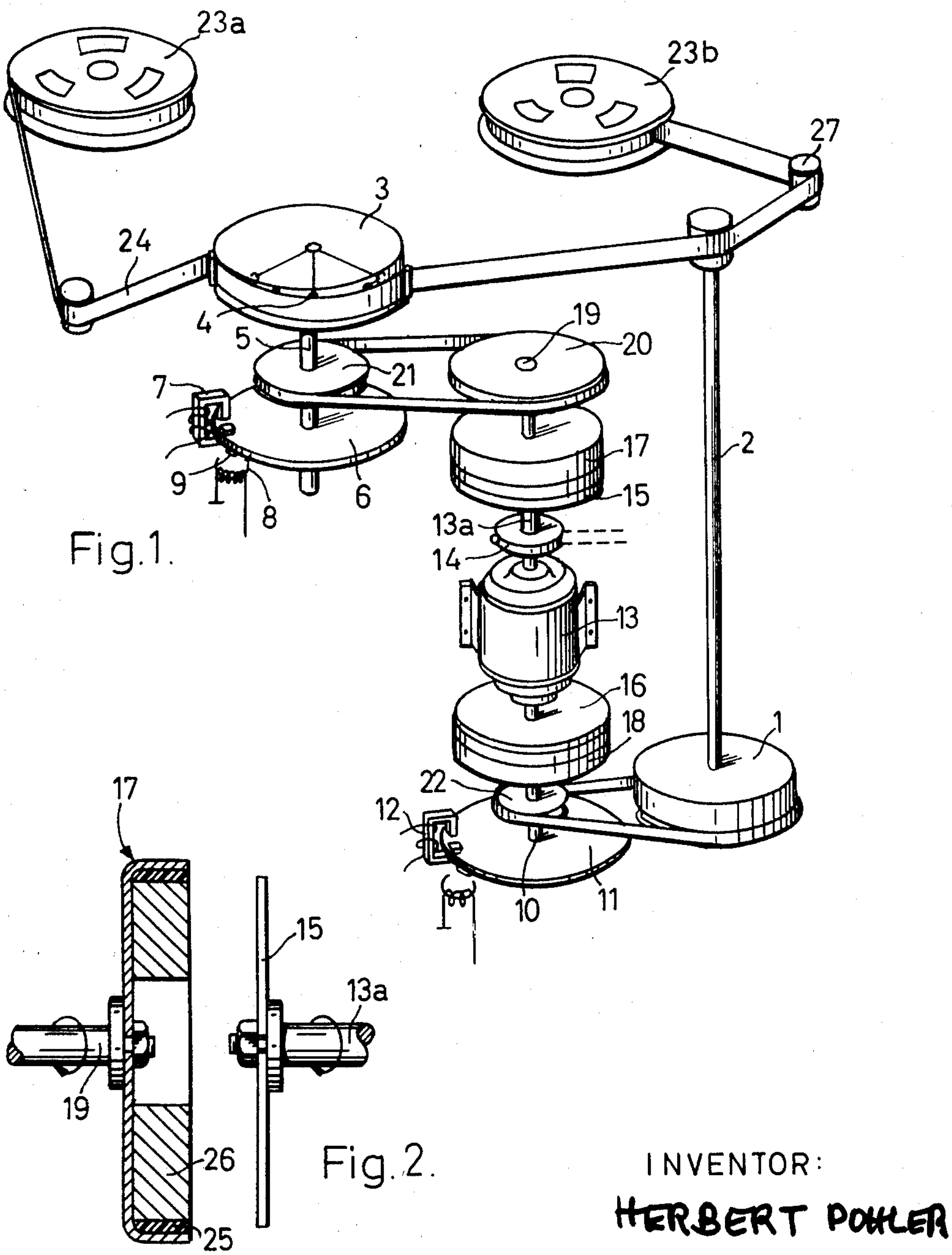
FIG. 1 illustrates a video tape recorder of the invention in perspective view.
FIG. 2 shows a hysteresis coupling of the apparatus of FIG. 1 in elevational section on its axis.
Figure 3:
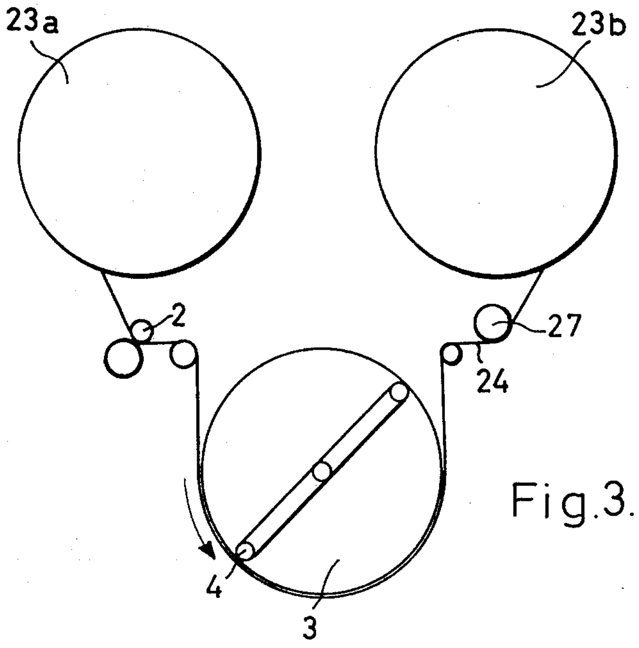
FIG. 3 is a fragmentary plan view of the apparatus of FIG. 1.
Figure 4:
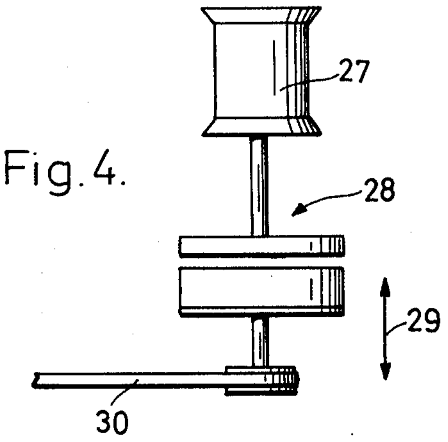
FIG. 4 shows a guide pulley arrangement of the recorder of FIG. 3 in elevation.

Referring initially to FIG. 1, there is shown only as much of an otherwise conventional video tape recorder as is necessary for an understanding of this invention. A magnetic, multiple-track tape 24 travels from a supply reel **23*a* to a takeup reel 23*b*. The tape passes an erasing head, a sound recording or reading head, and a synchronizing head (not shown), and a feed arrangement, including rubber roller 2*a* engaging the tape and driven by a capstan shaft 2 carrying a flywheel 1. The tape is drawn in a loop around an image drum, not itself seen in FIG. 1, in which a video head 4 is mounted on a wheel 3 coaxially fastened to a shaft 5. The takeup reel 23*b* is driven in a conventional manner not shown in FIG. 1**.

A known synchronizing mechanism keeps the head 4 synchronized with the frequency of the frame pulses. The rotary speed of the wheel 3 carrying head 4 is controlled by an eddy current brake consisting of an aluminum or copper disc 6 fastened to the shaft 5 and a brake magnet 7 whose airgap receives the circumferential portion of the disc 6. The electromagnet 7 is energized by a suitably amplified control voltage which is measured photoelectrically by means of a photoelectrical cell 8 and a white image marker 9 after each revolution of the disc 6 and is produced after phase comparison.

The drive for the magnetic tape 24 is controlled for synchronous operation with the video head, i.e., wheel 3, and for constant tape speed in such a manner that a pulse recorded on the tape corresponds during playback with a timing pulse in its frequency and its phase position. For this purpose, there is provided an eddy current brake which mainly consists of an electromagnet 12 and an aluminum or copper disc 11 which moves in the airgap of the magnet 12 when the drive shaft 10 for the tape drive rotates, and disc 11 being fixedly mounted on the shaft 10. The control voltage for the electromagnet 12 is controlled by a synchronizing track recorded on the magnetic tape after phase comparison and amplification.

The invention makes it possible for the brief variations in rotary speed, which ensure proper synchronization between the rotating video head and the drive for the magnetic tape, not to affect the single electric motor 13 which is provided for driving the entire system. The output shaft **13*a* projects from the motor 13 in both axial directions. The upwardly extending end of shaft 13*a* directly drives a nonillustrated permanent magnet coupling for the takeup reel 23*b* or the supply reel 23*a* by means of a belt indicated in broken lines and a belt pulley 14. The two ends at shaft 13*a* carry discs 15, 16 of hysteresis material which cooperate with spacedly coaxial permanent magnet plates 17, 18. The plate 17 is mounted on a shaft 19 which also carries a pulley 20 while plate 18 is mounted on shaft 10 which also carries pulley 22. Belts connect pulleys 20 and 22 respectively to pulley 21 and wheel 1 for driving shafts 5 and 2. The video head 4 is, therefore, rotated by means of the hysteresis coupling 15, 17**.

The permanent magnet plate 18 is mounted on the shaft 10. A belt trained over small pulley 22 on the shaft 10 and the flywheel 1 drives the shaft 2 of the magnetic tape drive at a reduced speed. The tape drive is thus connected to the motor 13 by the hysteresis coupling 16, 18. However, if motor 13 is a constant-speed motor, no coupling and brake is required between the output shaft of the motor and capstan shaft 2. In this case, pulley 22 may be mounted directly on shaft **13*a* for connection to flywheel 1. In either case, the single motor 13 rotates the video head or heads on wheel 3 and drives the magnetic tape 24 independently of the variations in rotary speed of the shafts 5, 2 which are caused by the eddy current brakes 6, 7 and 11, 12**, respectively.

The hysteresis coupling 15, 17 is shown in more detail in FIG. 2, and it will be understood that the coupling 16, 18 is substantially identical. The magnetic plate mounted on the shaft 19 includes a housing 17 of soft iron which has the shape of a shallow cylindrical cup. Its inner cylindrical wall carries a lining 25 of epoxy resin which envelops an annular magnet 26. The magnet consists of permanently magnetic, ceramic barium ferrite.

The coaxially opposite disc 15 of hysteresis material is fixedly fastened to the motor shaft **13*a*. It has a relatively high remanence and permeability, and requires but a small coercive force whereby it can be magnetized, with some resistance, by the cooperating coupling element 17. It is an important feature of this coupling that the torque remains practically constant at any rotary speed. The hysteresis material of the disc 15** may be a rolled steel containing up to about 1 percent C., about 15–16 percent Co, about 8–9 percent Cr, about 1.5 percent Mo, about 0.3 percent Si, about 0.2–0.3 percent Mn, and about 0.2 percent Ni. Such rolled steel, which is a staple article or commerce, should have a residual magnetic induction or magnetic retentivity of approximately 8,000 to 9,500 gauss, a reversible permeability of approximately 8 to 12, and a coercive field strength of approximately 160 to 220 oersted.

It is preferred to arrange a guide roller 27 between the takeup reel **23*b* and the image drum which envelops the flywheel 3. The roller 27 is connected with a driven, variable hysteresis coupling 28 whose input element may be adjusted axially as indicated by the arrow 29 and is connected to the output shaft of motor 13 by a belt 30**. This arrangement makes it possible to adjust the tape tension to suit operating conditions during recording or playback.

What is claimed is:

1. In a magnetic video tape recorder for recording or playing back magnetic signals including a rotatably mounted wheel carrying a magnetic head, a feed mechanism for moving an elongated magnetic record carrier past said head, and drive means for synchronously rotating said head and moving said record carrier, the improvement in the drive means which comprises:

a. a single drive motor, and b. a coupling drivingly interposed between said motor and said wheel, 1. said coupling having a first coupling member of a hysteresis material having a residual magnetic induction of approximately 8,000 to 9,500 gauss, a reversible permeability of approximately 8 to 12, and a coercive field strength of approximately 160 to 220 oersted, and a second coupling member of permanently magnetic material,
2. one coupling member of said one coupling being connected to said motor for joint rotation therewith, and
3. an eddy current brake operatively connected to the other coupling member for controlling the rotary speed of the same.

2. In the video tape recorder set forth in claim 1, said first coupling member being connected to said motor.

3. In the video tape recorder set forth in claim 1, a second coupling substantially identical with said first-named coupling drivingly interposed between said motor and said feed mechanism.

4. In the video tape recorder of claim 1, the motor being a constant-speed motor.

* * * * *